April 21, 1964     R. C. FERRIS ETAL     3,130,124

ALGAECIDE STICK COMPOSITION

Filed Dec. 21, 1959

INVENTORS,
ROBERT C. FERRIS
JOHN W. CHRISTENSEN
BY

Angus & Mon

ATTORNEYS.

United States Patent Office 3,130,124
Patented Apr. 21, 1964

3,130,124
ALGAECIDE STICK COMPOSITION
Robert C. Ferris, Fullerton, and John W. Christensen, Downey, Calif., assignors to Chem Lab Products, Inc., Norwalk, Calif., a corporation of California
Filed Dec. 21, 1959, Ser. No. 860,767
6 Claims. (Cl. 167—42)

This invention relates to an algaecide mixture and to means for utilizing the same.

The treatment of black algae, particularly as it occurs in swimming pools, is a troublesome one. The customary approach has been to dissolve an algaecide in the swimming pool water so that the algae will be killed by prolonged exposure to the same. Effective killing of these organisms in a suitably short time requires a significant concentration of algaecide. However, the concentrations that can actually be supplied are limited by considerations of human tolerance to the material, and by aesthetic considerations resulting from the facts that these chemicals are often highly colored, and in large concentrations may discolor the pool or actually stain its walls. Therefore, an uneasy balance must be struck, which usually involves a concentration of perhaps a few, or at the most, ten parts per million. At this very low concentration, the killing rate is very slow. Furthermore, some of the common algaecides are lost by evaporation, and must be replaced continually because of the long time that elapses. An unfortunate feature is that, in order to get even low concentrations, a far greater amount of algaecide must be used than would be needed to build up a large concentration in a localized area, which could speedily kill the algae.

It is an object of this invention to provide an algaecide and a means for using the same, whereby a very high concentration of the order of many thousands of parts per million can be applied directly to the limited area infested by the black algae, and which will remain in position long enough to do a thorough job of killing the same. Concentrations can thus be attained which are totally impractical for the whole body of water. In use, it has been found that algaecides according to this invention have succeeded in clearing up even stubborn cases of black algae within twenty-four hours, often within only two or three hours, and at no time yet has a case of black algae been encountered which was not completely cured by two successive applications of the algaecide.

Another object of the invention is to provide the algaecide in a convenient form so that it can be applied to the infested spots without requiring the person applying the algaecide to enter the swimming pool while doing so. The form may be either a stick which can be rubbed onto the pool wall, or a paste which can be smeared on.

According to a preferred but optional feature of this inventon, the algaecide is mixed with a matrix of a slowly water-soluble or water-dispersible material so that the mixture can be spread on the infested spot where it gradually dissolves, meanwhile remaining in contact with the black algae and killing it.

According to still another preferred but optional feature of this invention, the algaecide mixture is made in stick form, is covered by a water-resistant material, and is then enclosed by a slidable sheath so that only an end of the stick need be exposed directly to the water. Thus, the stick will not all dissolve merely by virtue of being immersed in the water.

The above and other features of this invention will be fully understood from the following detailed description and the accompanying drawings, in which.

Figure 1:
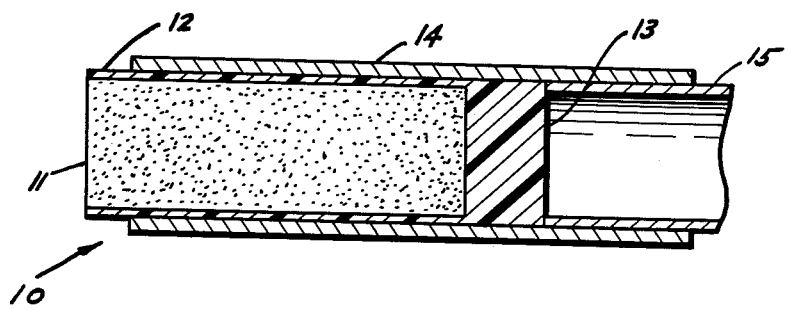
FIG. 1 is a cross-section of the presently preferred embodiment of the invention.
Figure 2:
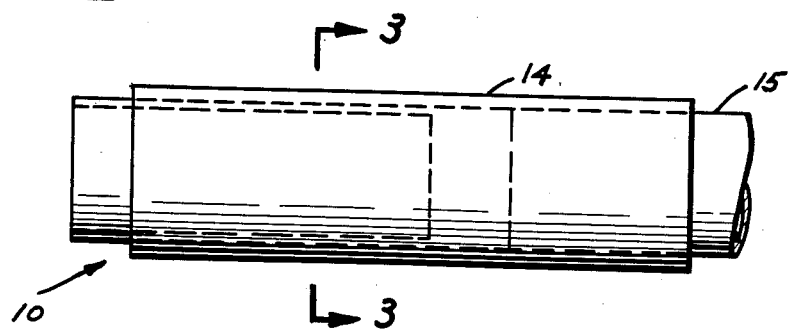
FIG. 2 is a side elevation of the construction shown in FIG. 1.
Figure 3:
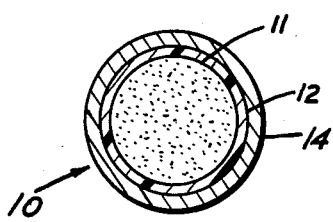
FIG. 3 is a cross-section taken at line 3—3 of FIG. 2.

In FIG. 1, a convenient means comprising a stick 10 is illustrated. The stick is formed of a coated and sheathed rod 11 of algaecide mixture. The side wall of this rod is coated by a layer 12 of a water-resistant material which is preferably flaky or abradable. The preferred material is paraffin. It is suitable because of its tendency to flake when abraded. The bits of paraffin rise to the surface of the water where they are carried off by the skimmer, and removed from the water by the filter. However, wrappings of foil, oiled paper, and the like, may be used for layer 12 instead of paraffin.

A plug 13, which is most conveniently made of paraffin, backs up the rod. A slidable sheath 14 surrounds the rod and its outer layer. The stick thus comprises a core of coated algaecidal material enclosed in a sheath. The plug may be pressed to cause as much of the stick as desired to protrude from the sheath.

A convenient means for utilizing this stick is shown in FIG. 1, where there is illustrated the end of a brush pole 15 of a type which is owned by most swimming pool owners. This is ordinarily a piece of aluminum tubing, although it is to be understood that any stick which will snugly fit within sheath 14 could be used instead, such as a solid wooden pole. Now, to smear the material of rod 11 on the wall of a swimming pool, it is merely necessary to slide the sheath over the brush pole so that a portion of the rod protrudes therefrom, and using the pole as a means for manipulating the stick, "paint" the algaecide mixture on the infested areas.

Layer 12 serves to keep the rod within the sheath. It has been found, when this layer is omitted, that after a short immersion in the water, water seeps between the sheath and the outside of the rod and dissolves some of the rod so that the rod falls out of the sheath and the convenient means for handling the stick as a unit is lost. However, when the water-resistant layer is provided, the paraffin or other material keeps the water out of intimate contact with the sides of the rod, and it has been found that the rod remains within the sheath for many successive uses, even after long immersion, so that the stick remains a convenient means for handling the algaecide material.

The material of which the algaecide mixture is formed may be any algaecidal material; that is, any material which is effective in killing black algae, while the matrix is preferably slowly water-soluble. Instead, the matrix may be a completely water-soluble material modified with additives that are only slightly soluble in water, or may be a water-dispersible rather than a water-soluble material, or a mixture of them.

There is a benefit to having a reduced rate of solubility or dispersability of the matrix, because after the mixture is applied to the wall of the swimming pool, the matrix tends to hold the "active" material in the vicinity of the application longer and gives better killing effect. When the proper materials are selected for the matrix as specified hereinafter, it is found that the applied algaecidal mixture tends to gradually absorb water, so that the concentration of the algaecide gradually lessens, and finally the body of immersed mixture begins to slough away. However, this takes many hours and in the meantime has provided directly in contact with the black algae a concentration of algaecide which would be impossible to achieve by simply dissolving algaecide in the water of the swimming pool.

For example, in a paste such as this stick utilizes, where there is initially little or no water in it, initial concentrations of perhaps a half-million parts per million parts of water are attained as water is gradually absorbed into the matrix. This concentration, of course, decreases gradually as the water is absorbed by the mixture, but even just as the algaecide is finally dissolved and sloughed away, the concentration immediately adjacent the black algae may be as great as ten thousand parts per million, which is vastly greater than can be gotten by conventional algaecidal treatment means. The concentration, even at its least values, is high enough to kill speedily. However speedily the algaecide may act, it is still desirable to have the algaecidal mixture in intimate contact with the wall of the pool for a number of hours. During that time, the material should serve as a shield to keep the coated wall surface from being washed clean of the material. The key to this is the use of a slowly dispersible or slowly soluble matrix.

Convenient means for obtaining a reduced rate of dissolution or dispersal of the mixture includes using for the matrix a high molecular weight water-soluble material which, although completely soluble in water, dissolves rather slowly. Another means is by blending in with a water-soluble material (which may dissolve relatively rapidly) a slower dissolving, or less soluble material. Still another is to use a water-dispersible material which disperses slowly.

In determining what material to use for the matrix, it is to be remembered that if the matrix is sufficiently reduced in water-solubility to eliminate the need of a protective layer such as the paraffin layer, the algaecide mixture may be reduced in activity, because the matrix will tend to hold the active material out of contact with the water and the algae. It is desired, of course, to build up a solution of algaecidal material in contact with the black algae, and it is therefore an objective to have this material dissolve or disperse, although slowly. However, this is merely a matter of degree rather than of kind, because even a very slowly soluble matrix will keep some algaecide in contact with the black algae for a long period of time, although usually at lesser concentrations than those at least initially attainable using more rapidly dissolving or dispersing matrices, and an effective job of killing will still be done. An algaecide with a very slowly dissolving or dispersing matrix may, however, require twenty-four hours, instead of perhaps only two or three hours, to do a job. Therefore, the solubility or dispersibility of the matrix is selected with the speed of killing in mind.

The matrix can be made from any one of, or a blend of, materials which are water-soluble or water-dispersible. They will most conveniently be solid, and preferably, somewhat waxy. A primary limitation on the selection of matrix is that its material must be chemically compatible with the algaecide itself. For example, if the algaecide comprises a quaternary ammonium compound, then the matrix cannot comprise an anionic surfactant or other incompatible compounds. If copper or silver is utilized as an algaecide, then alkaline compounds, oxidizing agents, or other incompatible compounds, cannot be used.

Examples of typical compositions that are suitable for the matrix are high molecular weight, non-ionic surfactants, which, of course, include both hydrophobic and hydrophillic groups. These compositions may, for example, be the well-known general types such as the ethylene and/or propylene oxide condensates of hydrophobic compounds, which are well-known building blocks for surfactants. Examples are ethylene oxide and/or propylene oxide condensates of fatty alcohols, fatty acids, fatty amides, Fischer-Tropsch alcohols, Fischer-Tropsch acids, Fischer-Tropsch amides, alkyl phenols, and waxy fatty acid glycerol esters. Generally, the hydrophobic groups of these molecules contain about 12 to 20 carbon atoms in their alkyl portions, and are made water-soluble or dispersible by condensing them with anywhere from about several to as many as about 20 mols of ethylene or propylene oxide. Also, the hydrophobic, as well as the hydrophillic, part of the high molecular weight surfactant may be made from ethylene or propylene oxide condensation products. In the latter case, a typical molecule would be produced by condensing about 160 mols of ethylene oxide with a polypropylene glycol made by the condensation of about 30 mols of propylene oxide. These structures may vary considerably, for example, containing about 20 mols of propylene oxide, and about 90 mols of ethylene oxide; or 40 mols of propylene oxide and about 200 mols of ethylene oxide.

The algaecidal active ingredient (sometimes herein called "algaecide") may be any one of a large number of compounds or mixtures known to be effective for killing black algae. Examples of these are the quaternary ammonium cationic surface active agents, for example, the acyl dialkyl benzyl ammonium chlorides or bromides, the trialkyl benzyl ammonium chlorides or bromides, the alkenyl dialkyl benzyl ammonium chlorides or bromides, the alkenyl trialkyl ammonium chlorides or bromides. Different hydrophobic groups may be substituted for the alkyl or alkenyl groups of these molecules, for example, alkyl phenols, fatty acids, alcohols, and amides.

Specific examples of quaternary ammonium compounds which are suitable algaecides are:

(1) Stearyl dimethyl benzyl ammonium chloride.
(2) Cetyl dimethyl ethyl ammonium bromide.
(3) Alkyl ($C_{12}$–$C_{18}$) dimethyl benzyl ammonium chloride.
(4) Alkenyl ($C_{12}$–$C_{18}$) dimethyl ethyl ammonium bromide.
(5) Di-isobutylphenoxyethoxy dimethyl benzyl ammonium chloride.

If desired, other algaecidally active compositions such as copper and silver compounds, may be utilized instead of the above. For example, copper sulphate can be used alone or in combination with citric acid. The citric acid will serve to aid in maintaining the activity of the copper sulphate in solution by restraining its undesirable tendency to hydrolyze to the hydroxide, which would discolor the pool. Also, any of the commonly-known algaecidal chelated copper compounds may be utilized. Further, the germicidal and algaecidal forms of active silver which are widely described in the literature, may be utilized as the active ingredient, such as the various dispersed silver oxide compositions.

Other known algaecides which may be utilized in this algaecidal mixture are the following: modified phenols (alkyl halo phenols); and modified ureas (chlorophenyl-dimethyl ureas). All percentages given throughout this specification are by weight.

Several specific examples of suitable compositions will now be given:

I (Preferred Embodiment)

(A) 1%–20% p-diisobutylphenoxyethoxyethyl dimethyl benzyl ammonium chloride.
(B) 0%–99% glycerol monostearate.
(C) 0%–99% polyethoxylated polypropylene glycol (M.W. approx. 9000—80% ethylene oxide and 20% propylene oxide; M.P. 120° F.).

Compound A is the algaecide; compounds B and C are the matrix. Compound B acts as a slowly water-dispersible material for the purpose of reducing the solubility rate of the matrix material as a whole. Compound C is completely, but slowly, soluble. The preferred percentages are: about 10% A; about 20% B; and about 70% C. Either B or C, or a combination of them will be supplied in the ranges indicated to make up 100%.

II (A) 1%–20% copper sulphate.
(B) 0.5%–10% citric acid.
(C) 35%–98.5% polyethylene glycol (M.P. ca. 130° F.; M.W. approx. 3000–4000).

(D) 0%–35% nonylphenol polyethylene glycol ether approx. 10 mols ethylene oxide).

Compound A is the algaecide. Compound B is part of the algaecide in the sense that it tends to prevent the hydrolysis of copper sulphate to the hydroxide, and thereby maintains the copper in solution in active form. Compounds C and D make up the matrix, both of them being slowly water-soluble materials. The use of the two compounds C and D illustrates that the rate of dissolving of the matrix may be selected by appropriately selecting the compositions of a mixture, which components have different rates of dissolving. The preferred percentages are about 10% A, about 5% B, about 50% C, and about 35% D. C alone, or a mixture of C and D in the ranges indicated, will be supplied to A and B to make up 100%.

III (A) 1%–20% alkenyl ($C_{12}$–$C_{18}$) dimethyl ethyl ammonium bromide.
(B) 80%–99% polyethoxylated polypropylene glycol (M.W. approx. 9000—80% ethylene oxide and 20% propylene oxide).

Compound A is the algaecide, and compound B is a slowly soluble material which forms the entire material of the matrix. This illustrates that the matrix may be made of a single material without use of water-dispersible materials, or other admixtures, if it is comprised of a material which itself has the proper rate of dissolving. The preferred percentages are about 5% A and about 95% B.

IV (A) 1%–20% 3-(p-chlorophenyl)-1,1-dimethyl urea.
(B) 0%–99% polyethylene glycol (M.W. approx. 4000).
(C) 0%–99% polyethylene glycol monostearate (M.W. approx. 1000).
(D) 0%–99% polyoxyethylated polypropylene glycol (M.W. approx. 6000).

Compound A is the algaecide. The matrix is made up of compounds B, C, and D, thereby illustrating that a matrix of the desired rate of dissolving may be attained by the selection and proper proportioning of more than two water-soluble materials, if desired. The preferred percentages are about 10% A, about 25% B, about 25% C, and about 40% D. Any one of B, C, and D, or any combination thereof, will be supplied to A to make up 100%.

All of the above examples make a firm stick which can be rubbed off on a pool wall. This is the preferred method for applying the mixture. However, it is sometimes preferred to smear the mixture on as a paste, perhaps by dipping a long-handled brush or sponge in the paste, and wiping the paste off on a submerged, algae-infested part of the wall. In that event, the mixture should be somewhat less viscous, and this lesser viscosity may conveniently be attained by adding water to the above formulations, in the range between about equal parts by weight of mixtures as defined above, and water, to about 9 parts by weight of said mixtures to one part water.

This invention thereby provides an algaecide mixture which can be applied directly to a spot of black algae on a submerged pool wall, where it will remain in contact with the spot, and slowly dissolve while maintaining at all times concentrations of algaecides in contact with the algae which are much higher than those attainable by the conventional method of simply dissolving an algaecide in the entire body of water.

The invention further provides a convenient means for utilizing the algaecide, whereby the stick of algaecide may be retained for successive use time after time, and which in use may be utilized on the end of a long pole so that the used need not go into the water to apply the same, and may of course apply it at any depth.

This invention is not to be limited by the embodiments shown in the drawings and described in the description which are given by way of example and not of limitation, but only in accordance with the scope of the appended claims.

We claim:
1. An algaecide stick composition comprising an algaecide toxic to black algae mixed in a solid waxy matrix having the properties of slowly but completely dispersing in water and of being compatible with the algaecide, said composition being adapted to be spread on a surface submerged in water, there to remain in contact with the said surface while gradually dispersing in the water, the algaecide simultaneously being retained in the undispersed matrix to provide and hold a high concentration of algaecide adjacent to the surface to kill algae thereon, the matrix serving to maintain this high concentration adjacent to said surface while a significant quantity of matrix remains in contact with the surface, the matrix ultimately completely dispersing into the water thereby to leave the surface free of matrix.
2. An algaecide stick composition according to claim 1 having an abradable outer layer of paraffin to bar water from contact with the sides of the stick when submerged.
3. An algaecide stick composition according to claim 1 wherein the algaecide is a quaternary ammonium cationic surfactant.
4. An algaecide stick composition according to claim 1 wherein the algaecide is p-diisobutylphenoxyethoxyethyl dimethyl benzyl ammonium chloride and wherein the matrix is composed of glycerol monostearate and of polyethoxylated polypropylene glycol characterized by a molecular weight of approximately 9000, an ethylene oxide content of 80%, a propylene oxide content of 20% and a melting point of 120° F.; said algaecide constituting about 10% of said composition, said glycerol monostearate constituting about 20% of said composition and said polyethoxylated polypropylene glycol constituting about 70% of said composition.
5. An algaecide stick composition according to claim 1 wherein said algaecide is copper sulphate.
6. An algaecide stick composition according to claim 1 wherein said algaecide is 3-(p-chlorophenyl)-1,1-dimethyl urea.

References Cited in the file of this patent

UNITED STATES PATENTS

| | | |
|---|---|---|
| 2,021,137 | Stone | Nov. 19, 1935 |
| 2,380,877 | Shelton | July 31, 1945 |
| 2,400,863 | Gelfand | May 21, 1946 |
| 2,419,021 | Harnden | Apr. 15, 1947 |
| 2,551,446 | Marks | May 1, 1951 |
| 2,593,529 | Borglin | Apr. 22, 1952 |
| 2,635,055 | Figdor | Apr. 14, 1953 |
| 2,826,484 | Buehler | Mar. 11, 1958 |
| 2,934,409 | Biehl | Apr. 26, 1960 |
| 2,971,883 | Swinyar | Feb. 14, 1961 |

FOREIGN PATENTS

| | | |
|---|---|---|
| 2,221 | Great Britain | Aug. 8, 1862 |

OTHER REFERENCES

Palmer, Jour. AWWA, vol. 48, September 1956, pages 1133–1137.

Palmer et al.: The Ohio Journal of Science, vol. LV, No. 1, January 1955, pages 1–8.